Patented July 28, 1931

1,816,447

UNITED STATES PATENT OFFICE

RICHARD E. SUMNER, OF PLAINFIELD, NEW JERSEY, ASSIGNOR TO THE CALCO CHEMICAL COMPANY, INC., OF BOUND BROOK, NEW JERSEY, A CORPORATION OF DELAWARE

SHELLAC COMPOSITION

No Drawing.  Application filed April 9, 1930. Serial No. 443,000.

This invention relates to shellac compositions and more especially to compositions for use in making phonograph record discs.

The invention aims to provide a shellac composition for making phonograph records which is of better quality than, and may be made at less cost than, the shellac compositions heretofore used for that purpose. For making disc records, it has long been customary to utilize a composition consisting of fillers of various kinds, such as terra alba and barytes, bound together with an agglomerant consisting either of pure shellac, or of shellac adulterated with less expensive substitutes such as Copal and Damar resins. Such compositions have heretofore contained an insoluble pigment, usually carbon black.

I have discovered that a more durable and evenly colored record composition may be produced at less expense, by omitting the usual carbon black and incorporating induline base dye in the composition. By this means, an even and effective coloring of the whole composition is secured, while at the same time the shellac content of the composition may be reduced with a resulting saving in cost.

A specific example of a composition embodying the invention and adapted to produce a blue-black record consists of the following ingredients in the proportions specified:

|  | Parts |
|---|---|
| Shellac | 31.5 |
| Induline base | 1.5 |
| Filler | 67 |

This composition produces a record superior in strength, in durability and in color to one produced from a similar composition having carbon black as the coloring medium and containing 6% more shellac than my composition.

The filler may consist of any of the ingredients or mixtures of ingredients heretofore used in record compositions, and the agglomerant may be either pure shellac or adulterated shellac (i. e. shellac substitutes with a substantial portion of pure shellac), both of which are to be understood to be included by the term "shellac" as used herein.

What I claim is:

1. A composition of matter for use in making phonograph records and for other purposes, comprising a filler, a shellac agglomerant by which the filler is bound together, and an induline base dye.

2. A composition of matter for use in making phonograph records consisting of shellac and a filler, and containing approximately 1.5% of induline base dye.

3. A composition of matter for phonograph records having substantially the following composition:—shellac 31.5%; induline base 1.5%; and filler 67%.

In testimony whereof I have hereunto set my hand.

RICHARD E. SUMNER.